United States Patent
Borsos et al.

(10) Patent No.: US 8,750,133 B2
(45) Date of Patent: Jun. 10, 2014

(54) METHOD AND MONITORING COMPONENT FOR NETWORK TRAFFIC MONITORING

(75) Inventors: Tamas Borsos, Budapest (HU); Gábor Tóth, Szigetszentmiklós (HU); Szabolcs Malomsoky, Szentendre (HU)

(73) Assignee: Telefonaktiebolaget L M Ericsson (Publ), Stockholm (DE)

( * ) Notice: Subject to any disclaimer, the term of this patent is extended or adjusted under 35 U.S.C. 154(b) by 567 days.

(21) Appl. No.: 12/738,400

(22) PCT Filed: Oct. 16, 2007

(86) PCT No.: PCT/EP2007/008962
§ 371 (c)(1),
(2), (4) Date: Apr. 20, 2010

(87) PCT Pub. No.: WO2009/049644
PCT Pub. Date: Apr. 23, 2009

(65) Prior Publication Data
US 2010/0226278 A1 Sep. 9, 2010

(51) Int. Cl.
*H04L 12/26* (2006.01)

(52) U.S. Cl.
CPC .................... *H04L 12/2602* (2013.01)
USPC .......................................... 370/242; 370/248

(58) Field of Classification Search
USPC ............... 370/229–256, 229–236.2, 385–399
See application file for complete search history.

(56) References Cited

U.S. PATENT DOCUMENTS

| | | | |
|---|---|---|---|
| 5,548,589 A * | 8/1996 | Jeon et al. | 370/399 |
| 6,119,000 A | 9/2000 | Stephenson et al. | |
| 7,590,062 B2 * | 9/2009 | Delegue et al. | 370/230.1 |
| 8,369,229 B2 * | 2/2013 | Jones | 370/248 |
| 2001/0021176 A1 * | 9/2001 | Mimura et al. | 370/235 |
| 2002/0055996 A1 * | 5/2002 | Sugauchi et al. | 709/223 |
| 2002/0176378 A1 * | 11/2002 | Hamilton et al. | 370/328 |
| 2003/0133410 A1 * | 7/2003 | Kang et al. | 370/230 |
| 2004/0057378 A1 * | 3/2004 | Gronberg | 370/230 |
| 2004/0105392 A1 | 6/2004 | Charcranoon | |
| 2006/0039316 A1 * | 2/2006 | Ogushi | 370/328 |

FOREIGN PATENT DOCUMENTS

| | | | | |
|---|---|---|---|---|
| EP | 1 885 140 A | | 2/2008 | |
| GB | 2406465 A | * | 3/2005 | |
| GB | 2424341 A | * | 9/2006 | H04L 12/56 |
| WO | WO 2006/057586 A | | 6/2006 | |

* cited by examiner

*Primary Examiner* — Kwang B Yao
*Assistant Examiner* — Juvena Loo

(57) ABSTRACT

A technique for traffic monitoring in a network comprising monitoring components and a management center (MC) is described. A method implementation comprises the steps of selecting a first set of local identifiers from a larger second set of local identifiers, wherein the local identifiers are capable of providing a unique identification of a network connection at the first monitoring component, filtering network connections, allocating a local identifier of the first set of local identifiers to a network connection in case a filter condition applies during the filtering, checking associations of network traffic with local identifiers, and selectively monitoring network traffic associated with a local identifier from the first set of local identifiers.

19 Claims, 7 Drawing Sheets

METHOD AND MONITORING COMPONENT FOR NETWORK TRAFFIC MONITORING

TECHNICAL FIELD

The invention generally relates to the field of traffic monitoring within a network. More specifically, the invention relates to a technique for traffic monitoring at a monitoring component based an identifiers allocated to network connections.

BACKGROUND

Since data traffic transmitted over networks is steadily growing, traffic monitoring is becoming increasingly important for network suppliers and network operators in order to determine the so-called quality of service (QoS) within the network. There are principally two ways for determining the QoS in a network by means of traffic monitoring.

One way is to perform traffic measurements at a user terminal. User terminals specially designed for providing traffic measurement functions can be used for such measurements. For example, the TEMS mobile terminals from Ericsson are designed for monitoring service and network performance remotely at the terminal. Such terminals enable network suppliers and network operators to measure end-user perceived quality.

Another possibility is to perform passive measurements within the network. Passive measurement means that network traffic is captured at certain interfaces within the network. Performance indicators indicative of the QoS are obtained by processing the captured network traffic. In case of passive measurements, end-user perceived quality is approximated by means of the performance indicators.

U.S. Pat. No. 6,807,156 B1 concerns a method and a system of identifying and determining degradation of the QoS perceived by a subscriber in a network. Traffic of individual applications of the subscriber and aggregated traffic of a subscriber are monitored, captured and processed to produce QoS statistics.

Although end-user perceived performance may best be observed at a mobile terminal, the approach of passive measurements in the network still has a plurality of advantages over measurements at the user terminal.

In particular, no specifically designed user terminals are needed, all user terminals in a live network can be observed, and cost-efficient, large-scale monitoring is possible because a limited number of measurement points can cover a large part of a network. Furthermore, by means of passive measurements, not only end-user perceived performance can be observed, but also traffic composition and volume. In particular, the most popular applications and traffic demands of typical users or power users can be determined. Another advantage of passive measurements is that faults can be localized, and the cause of performance degradations, i.e. bottlenecks, within the network can be found.

Due to the above described advantages, passive traffic monitoring based on performance, fault-analysis and traffic modelling is becoming an increasingly important part of network audit and management services. However, existing and proposed passive traffic monitoring solutions have a plurality of drawbacks.

One solution for passive measurements captures all traffic at a single monitoring point. Since the prices for network access and network services decrease, the number of subscribers which are using network applications having a high bandwidth requirement is increasing. Therefore, if all traffic is captured at a single monitoring point, i.e. at a certain network interface, a huge amount of traffic may need to be captured within a short period of time. However, it is difficult to handle and process such a huge amount of captured traffic. In case too much traffic would be captured, measurement intervals will have to be shortened. Such a shortening of the traffic monitoring intervals provides the disadvantage that certain types of events, for example subscribers attaching to the network or handovers, which are too rare events, will not produce a statistically reliable sample set. Furthermore, long-term statistics like daily profiles cannot be provided.

Other passive measurement solutions have been proposed in which traffic is filtered and processed in real time during capturing. However, such a real time filtering and processing faces the problem of fulfilling the real time transmission requirements. Data transfer rates of monitored links can be in the order of several Giga bit per second (Gbps). Furthermore, the utilization of such links constantly increases. Even when special hardware for traffic filtering and processing is incorporated at a monitoring point, real time filtering and processing algorithms will soon reach real time limits.

Moreover, in order to provide user-oriented performance measurements, for example end-to-end packet delay or call setup delay, signalling and data traffic of a subscriber has to be monitored at two or more monitoring points within the network. Such a user tracking at two or more monitoring points requires a harmonization of the monitoring at the measurement points. Harmonization may be based on International Mobile Subscriber Identities (IMSI), which exactly identifies each subscriber. However, the IMSI is not available in every network node and during each signalling phase. Furthermore, the IMSI is not present in each data packet of a subscriber. Thus, for traffic monitoring at two or more monitoring points, the monitoring points have to maintain a mapping table and have to perform a table look-up for each data packet passing a certain network node. Since data packets are passing the network nodes with data transfer rates of several Gbps, such table look-up requires sophisticated hardware and a huge amount of processing power.

A solution of this problem could be the use of real time signalling of filtering information between monitoring points. However, strict delay requirements between the monitoring points would have to be fulfilled. Also, such real time signalling consumes processing power which cannot be spent for traffic monitoring.

SUMMARY

Accordingly, there is a need for a technique of traffic monitoring in a network which avoids at least some of the disadvantages of the known passive network traffic monitoring solutions.

This need is satisfied according to a first aspect by a method for monitoring traffic in a network comprising a first monitoring component, the method comprising the steps of selecting a first set of local identifiers from a larger second set of local identifiers, wherein the local identifiers are capable of providing a unique identification of a network connection at the first monitoring component, filtering network connections, allocating a local identifier of the first set of local identifiers to a network connection in case a filter condition applies during the filtering, checking associations of network traffic with local identifiers, and selectively monitoring network traffic which is associated with a local identifier from the first set of local identifiers.

According to the approach proposed herein, only local identifiers from a first set of local identifiers, which have been selected from a larger set of second local identifiers, are used for monitoring network traffic. This selection may take place at the monitoring component or at a management centre. Local identifiers are used locally within a network node for example to identify subscribers and may be allocated to network connections either directly or indirectly (i.e., via other entities such as terminals or subscribers associated with the network connections).

Incoming network traffic is checked at the monitoring component for its local identifiers. This may for example be realized in that incoming data packets are checked for their local identifiers. The local identifier may be included in the header of the data packet, or it may otherwise be associated therewith either directly or indirectly (e.g., via a user terminal or a subscribers). Therefore, a data packet passing through a monitoring component can be clearly associated with a network connection (a subscriber) by means of its local identifier. Accordingly, checking associations of network traffic with local identifiers at the monitoring component can be performed without a high amount of processing power (e.g., mobile network nodes anyway assemble and disassemble data packets during core network processing). After local identifiers have been allocated to an active network connection, reallocation may be avoided. Moreover, a filter decision, i.e. whether a network connection is selected for monitoring or not, may be taken before the local identifier is allocated.

The monitoring component may be any kind of network node, such as a monitoring function or an interface within a network node or an external capturing device, which may be located between two network nodes. The network may be a packet data network, in particular a mobile packet data network. The local identifiers may also be capable of providing a unique identification of each packet of a network connection at the first monitoring component.

In one implementation, the network connections are filtered during network connection setup procedures. In this implementation, filtering of network connections only takes place during setup, for example in case a call establishment request is received. The filtering may take place during each network connection setup procedure and based on a filter condition.

The filter condition may be based on at least one of a random selection of local identifiers, a selection of predefined International Mobile Subscriber Identities (IMSI) and a subscriber location-dependent selection of local identifiers. The traffic monitoring approach proposed herein is based on the basic idea that only a subset of network connections, i.e. subscribers, defined by the filter condition gets monitored.

Random selection of local identifiers is a way to avoid monitoring all network connections. A selection of subscribers based on their IMSI may be employed as a filter condition in case previous knowledge about the subscribers is available. For example, the previous knowledge could be whether the subscriber is a very important person (VIP) user, a business user, a power user who generates a lot of traffic, a very mobile user, i.e. a user who changes his location frequently (for example according to information obtained from the associated Home Subscriber Server (HSS)), or a subscriber who provides a lot of negative feedback at customer service desks or via operator portals. In such cases, a number of IMSIs may be selected as a filter condition. For subscriber location-dependent selection of local identifiers, certain network cells, for example network cells having a high traffic load, may be selected, and subscribers that initiate any kind of activity from these cells could be monitored. This type of filtering may be triggered by the Radio Network Controller (RNC). However, the present invention is not limited to the above described filter conditions. Other filter conditions may be employed also.

According to a further aspect, only local identifiers of the lowest applicable protocol layer of the network are assigned and monitored. By monitoring low protocol level local identifiers at several interfaces, i.e. at several monitoring components, within the communication network, events captured at these interfaces can be easily correlated.

The filter condition may be received by the first monitoring component from a management centre. The management may be a separate network function which is capable of communicating with a plurality of network components. The management may also be incorporated within a network component. According to this aspect, the management centre administrates the filter conditions and distributes them to the monitoring components.

According to a further aspect, at least a second monitoring component is provided in the network for traffic monitoring. By means of the second monitoring component, coordinated traffic monitoring within the network becomes possible.

According to a still further aspect, the first set of local identifiers may be forwarded from the first monitoring component to the second monitoring component. This forwarding may be a direct transfer of the first set of local identifiers between monitoring components or an indirect transfer for example via the management centre. When the first set of local identifiers is known at both the first and the second monitoring component, coordinated network traffic monitoring of specific subscribers is possible.

The first set of local identifiers may be forwarded from the first monitoring component to the management centre. The management centre may request the first set of local identifiers from the first monitoring component in order to forward it to the second monitoring component for coordinated traffic monitoring within the network. Once the first monitoring component has selected a network connection to be a monitored connection and has allocated a previously selected local identifier to the network connection, it can thus be ensured that for a connection setup or for traffic routing at a second monitoring component, local identifiers from the first set of local identifiers will be used. There may also be provided a matching network or a look-up table within the management centre and/or the second monitoring component which provides an association between the first set of local identifiers and corresponding local identifiers at the second monitoring component.

Based on the above described forwarding of the first set of local identifiers, an implicit signalling between the monitoring components takes place. By means of this implicit signalling, the information that a specific subscriber or network connection should be monitored network-wide is propagated from one monitoring component to another monitoring component. This implicit signalling may continue towards further monitoring components. The approach proposed herein enables a coordinated monitoring of the network traffic of the same subscriber or network connection at two or more monitoring components, although the filter condition was only applied and checked at one (the first) monitoring component.

The management centre may also forward the first set of local identifiers to at least one further (third) monitoring component or to an external capturing device.

Thereby, coordinated traffic monitoring at a plurality of monitoring components within the network is possible, whereby real time signalling can be avoided. The management centre may be in charge of this network-wide coordination.

According to a further aspect, the filter condition is received by the first and/or the second monitoring component from the management centre in order to enable coordinated traffic monitoring at the first and second monitoring component. According to this aspect, the management centre defines and forwards the filter conditions to two or more monitoring components. The management centre thereby coordinates that the same filter conditions are available at all monitoring components. By means of this approach, real time signalling between the monitoring components can again be avoided.

According to a further aspect, the method comprises the step of logging events including time stamps associated with monitored network traffic. Upon instruction from the management centre, the monitoring components can log time stamped events of monitored subscribers or network connections. This logging can be done at any protocol layer.

According to a still further aspect, the method comprises the step of sending the logged events to a physical monitoring port. The physical monitoring port can be an individual device or may be incorporated within the monitoring component. In case the monitoring component is an individual device, the logged traffic data can be evaluated independently from the monitoring component.

According to another aspect, the first set of local identifiers is a continuous range of local identifiers. The selected first set of local identifiers can also be a number of discrete local identifiers which do not form a continuous range. In case the first set of local identifiers is not a continuous range of local identifiers, it may be determined by means of a (preferably simple) arithmetic operation whether a local identifier belongs to the first set of local identifiers.

There is also provided a method for monitoring traffic in a network having at least a first monitoring component. The method comprises the steps, performed by the management centre, of forwarding filter conditions to the at least one monitoring component for filtering network connections during network connection setup procedures and of receiving a first set of local identifiers from the at least one monitoring component, wherein the first set of local identifiers has been selected from a larger second set of local identifiers and wherein the local identifiers are capable of providing a unique identification of a particular network connection. The at least one management centre may be a management instance which is coordinating traffic monitoring in a communication network between a plurality of monitoring components and optionally an external capturing device. The filter conditions may be generated at the management centre.

The management centre may forward the filter conditions to a second monitoring component and/or an external capturing device. This forwarding of filter conditions may be executed before a start of the traffic monitoring.

According to a further aspect, the method comprises the step of forwarding the first set of local identifiers to a second monitoring component and/or an external capturing device for coordinated traffic monitoring. The management centre may request the first set of local identifiers from a specific monitoring component. Thereafter, the management centre may forward this set of local identifiers to another monitoring component or to an external capturing device. Thereby, coordinated traffic monitoring within the network is enabled and real time signalling between the monitoring components can at least partially be avoided. Furthermore, the management centre may invoke measurement jobs within a monitoring component or an external capturing device.

The invention can be practised in the form of hardware, in the form of software or in the form of a combined hardware/software approach. As for a software aspect, a computer program product is provided. The computer program product comprises program code portions for performing the steps of the present invention when the computer program product is run on one or more components of a network. The computer program product may be stored on a computer-readable recording medium.

As for a hardware aspect, a monitoring component for monitoring traffic in a network is provided. The monitoring component comprises a function for providing a first set of local identifiers from a larger second set of local identifiers, wherein the local identifiers are capable of providing a unique identification of a network connection within the first monitoring component, a filtering function for filtering network connections, an allocating function for allocating a local identifier of the first set of local identifiers to a network connection in case a filter condition applies during the filtering, a checking function for checking associations of network traffic with local identifiers, and a monitoring function for selectively monitoring network traffic which is associated with a local identifier from the first set of local identifiers. The first set of local identifiers may be selected within the monitoring component, or the monitoring component may receive the first set of local identifiers from a management centre.

The monitoring component may be implemented in a network component, e.g. in a Radio Base Station (RBS), a Radio Network Controller (RNC), a General Packet Radio Service (GPRS) Support Node (SGSN), a Gateway GPRS Support Node (GGSN) or any other suitable network node. The monitoring component may be capable of executing one or more of the following tasks: communicating sets of local identifiers for monitoring to a management centre or to another monitoring component, allocating local identifiers from the set of local identifiers for monitoring if a filter condition applies, allocating a local identifier from a larger set of local identifiers for monitoring if a data packet, i.e. a local identifier, from another, neighbouring monitoring component has also been allocated for traffic monitoring, providing detailed event logs with accurate time stamping of the monitored subscribers and, upon instruction, sending network traffic data of monitored subscribers to a physical monitoring port.

According to a further hardware aspect, a management centre for monitoring traffic in a network is provided. The management centre comprises a forwarding function for forwarding filter conditions to at least one monitoring component for filtering network connections during network connection set up procedures, and an interface for receiving a first set of local identifiers from the at least one monitoring component, wherein the first set of local identifiers has been selected from a larger second set of local identifiers and wherein the local identifiers are capable of providing a unique identification of a particular network connection.

The management centre may be capable of executing one or more of the following tasks: invoking measurement jobs within the monitoring components and/or an external capturing device, communicating sets of local identifiers to the monitoring components and/or the external capturing device, and defining and communicating filtering conditions to the monitoring components and/or the external capturing device.

According to a still further hardware aspect, an external capturing device is provided. The external capturing device may be a passive probe. The external capturing device may be capable of receiving a first set of local identifiers for monitoring and capturing network traffic which is associated with local identifiers from first the set of local identifiers. The external capturing device may also be capable of receiving filter conditions. In particular, an external capturing device may be employed in case a network node is not capable of performing network traffic measurements, or it would require too much effort in order to adapt the network nodes to be capable of traffic monitoring or to incorporate a monitoring component.

According to a still further hardware aspect, a network system comprising at least one monitoring component as proposed herein and a management centre as proposed herein is provided. Optionally, the network system may comprise an external capturing device.

BRIEF DESCRIPTION OF THE DRAWINGS

In the following, the invention will be described with reference to exemplary embodiments illustrated in the drawings, in which.

DESCRIPTION OF PREFERRED EMBODIMENTS

In the following, for purposes of explanation and not limitation, specific details are set forth, such as particular sequences of steps, interfaces and configurations, in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or a general-purpose computer. It will also be appreciated that while the current invention is primarily described in the form of methods and apparatuses, the invention may also be embodied in a computer program product as well as in a system comprising a computer processor and a memory coupled to the processor, wherein the memory is encoded with one or more programs that may perform the functions disclosed herein.

Figure 1:
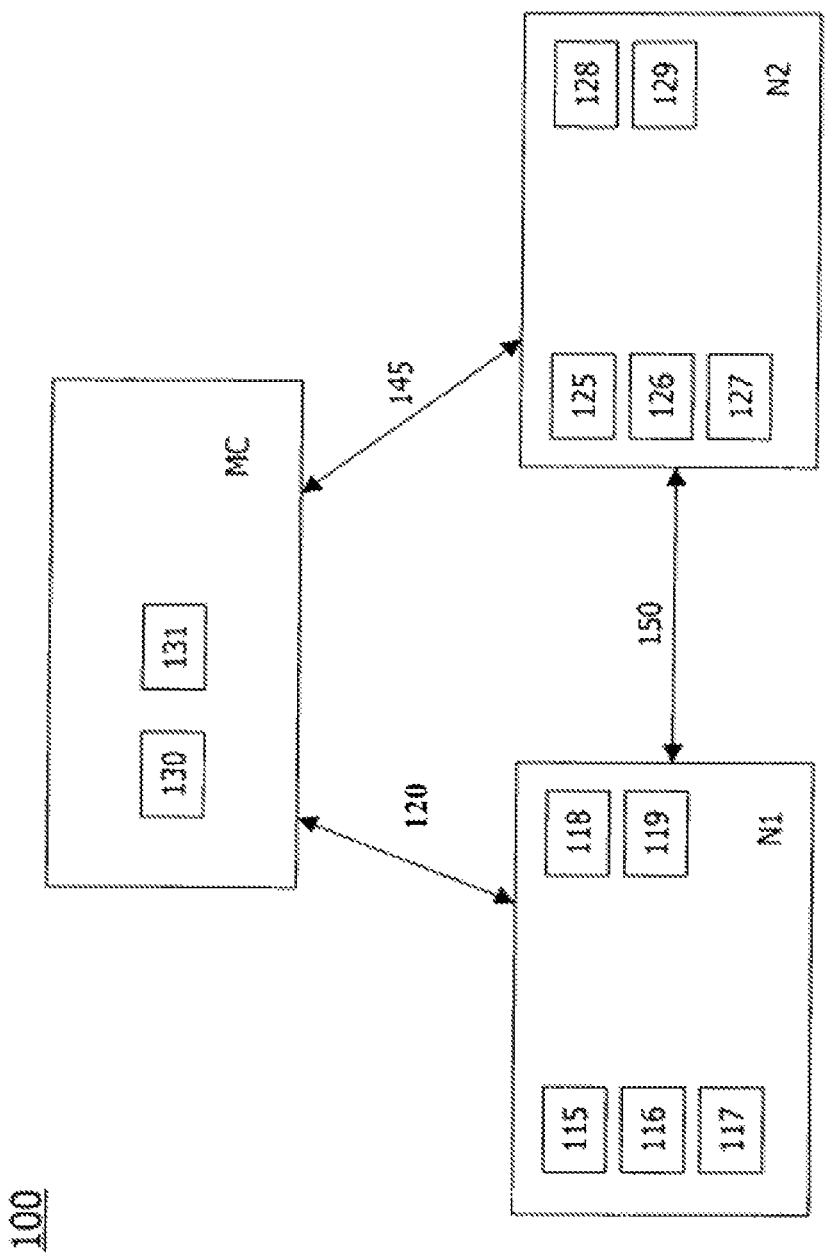
FIG. 1 is a first schematic block diagram illustrating a communication network including apparatus embodiments.

FIG. 1 shows a first schematic block diagram illustrating a communication network 100 including various apparatus embodiments. The communication network 100 comprises a first monitoring component N1, a second monitoring component N2 and a management centre MC. First and second monitoring components N1 and N2 are incorporated in separate network nodes (not shown), and management centre MC is a separate entity within the communication network. Monitoring component N1 is in communication via link 150 with monitoring component N2. Monitoring component N1 also communicates (via link 120) with management centre MC, and management centre MC communicates via link 145 with monitoring component N2. Network traffic is forwarded between network components N1 and N2 over link 150.

Monitoring component N1 comprises a function 115 for providing a first set of local identifiers from a larger second set of local identifiers. The first set of local identifiers is in this embodiment selected within and by the first monitoring component. The local identifiers are locally assigned and capable of providing a unique identification for a network connection within the first monitoring component N1. First monitoring component N1 further comprises a filtering function 116 for filtering network connections, an allocation function 117 for allocating a local identifier of the first set of local identifiers to a network connection in case a filter condition applies during the filtering, a checking function 118 for checking associations of network traffic with local identifiers, and a monitoring function 119 for monitoring network traffic, which is associated with a local identifier from the first set of local identifiers.

Monitoring component N2 has a similar configuration like monitoring component N1 and comprises a function 125 for providing a first set of local identifiers from a lager second set of local identifiers, a filtering function 126 for filtering network connections, an allocation function 127 for allocating a local identifier of the first set of local identifiers to a network connection in case a filter condition applies during the filtering, a checking function 128 for checking associations of network traffic with local identifiers and a monitoring function 129 for monitoring network traffic, which is associated with a local identifier from the first set of local identifiers.

Management centre MC comprises a forwarding function 130 and an interface 131. Forwarding function 130 forwards via link 120 filter conditions to the first monitoring component NI for filtering network connections during network connections setup procedures. Interface 131 is configured to receive the first set of local identifiers from first monitoring component NI and, optionally, to forward it to second monitoring component N2.

Figure 2:
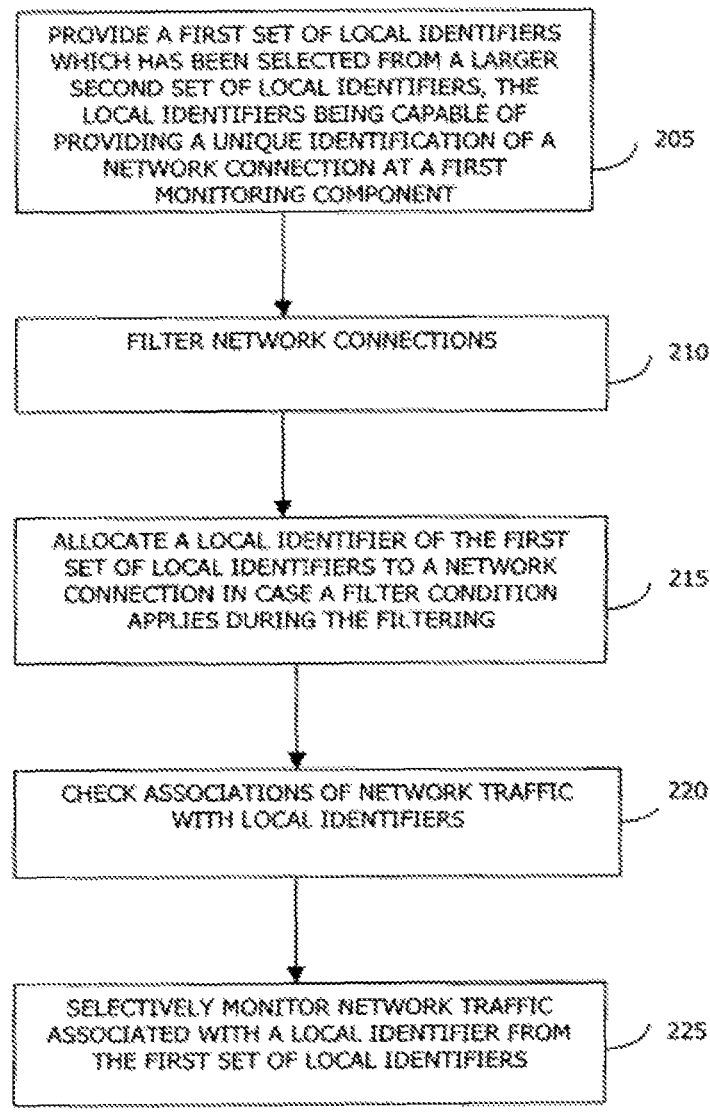
FIG. 2 is a flow chart illustrating a first method embodiment relating to monitoring network traffic.

FIG. 2 shows a flow chart illustrating a first method embodiment relating to monitoring network traffic. The method embodiment may be practiced by one or both of monitoring components N1 or N2 shown in FIG. 1 or by any other apparatuses.

The method starts in step 205 with providing a first set of local identifiers selected from a lager second set of local identifiers. The selection may, for example, be performed by one of monitoring components N1 and N2, or, in the alternative, by management centre MC and signalled to one or both of monitoring components N1 and N2. The local identifiers are capable of providing a unique identification of a network connection at least at a first monitoring component.

Then, in step 210, network connections are filtered. In a next step 215, a local identifier of the first set of local identifiers is allocated to a network connection in case a filter condition applies during the filtering. Thereafter, in step 220, associations of network traffic with local identifiers are checked. In the subsequent step 225, network traffic is selectively monitored if, and only if, it is associated with a local identifier from the first set of local identifiers. The monitoring may be performed with the aim of determining QoS parameters or general statistics.

Figure 3:
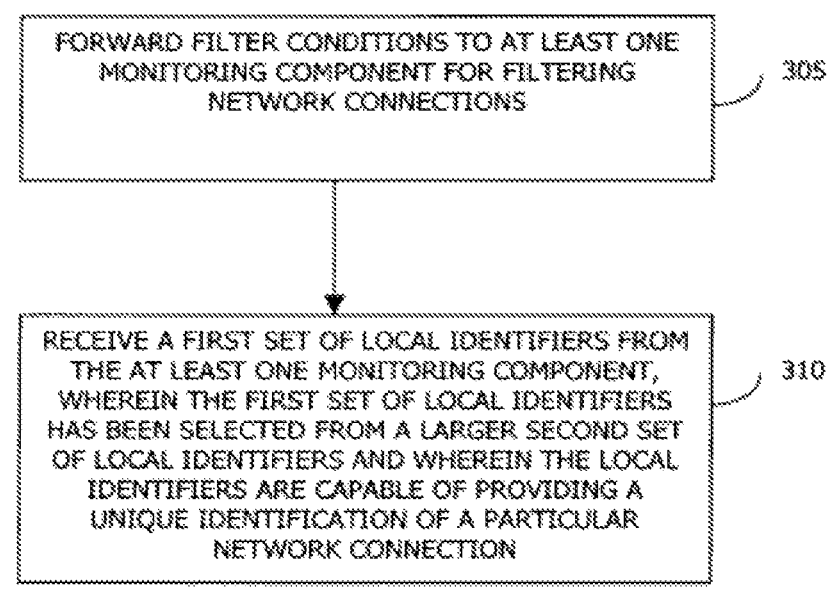
FIG. 3 is a flow chart illustrating a second method embodiment relating to monitoring network traffic.

FIG. 3 shows a flow chart 300 of a further method embodiment. The method embodiment shown in FIG. 3 may be practiced by management centre MC shown in FIG. 1 or by other apparatuses.

The method starts in step 305 with forwarding filter conditions to at least one monitoring component for filtering network connections during network connection setup procedures. Thereafter, in step 310, a first set of local identifiers is received from the at least one monitoring component. The first set of local identifiers has been selected from a larger second set of local identifiers, and the local identifiers are capable of providing a unique identification of a particular network connection.

In the following embodiments, various exemplary scenarios of traffic monitoring in a Universal Mobile Telecommunications System (UMTS) network are described. However, the present invention is not limited to networks which are working in compliance with the UMTS standard. The present invention is also applicable with other network standards including, for example, a Global System for Mobile Communication (GSM) network.

Figure 4:
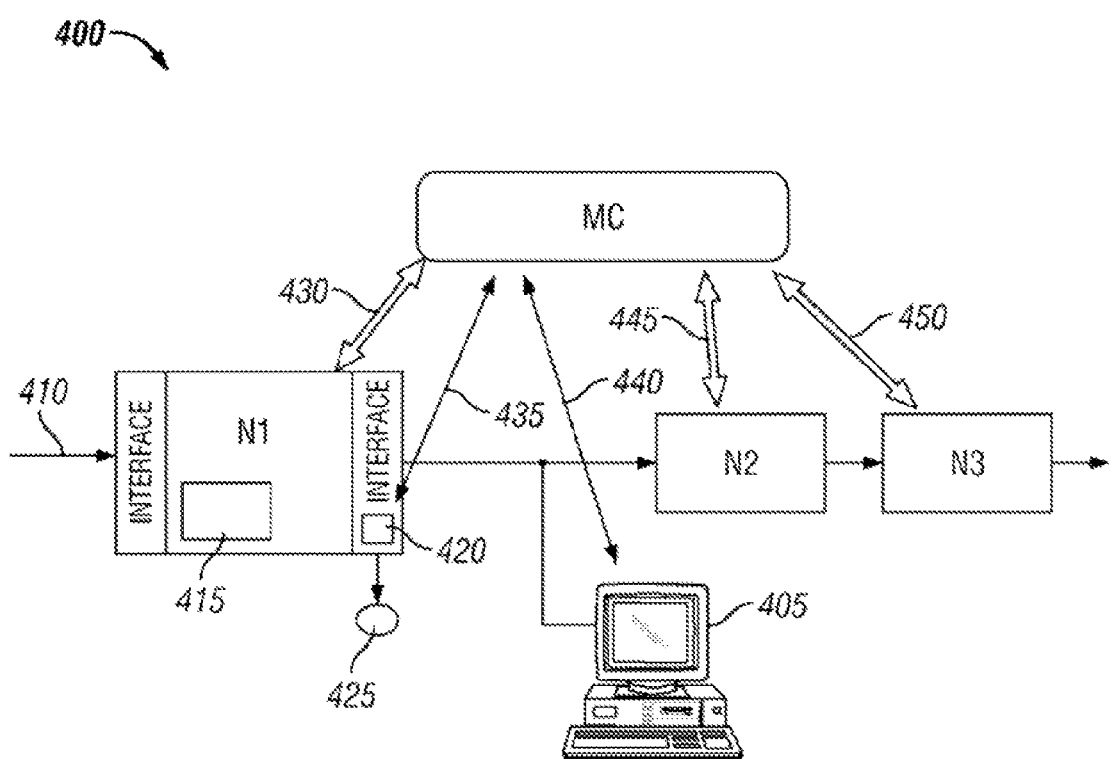
FIG. 4 is a second schematic block diagram illustrating a communication network including apparatus embodiments.

FIG. 4 shows a schematic block diagram illustrating a communication network 400 including three network nodes N1, N2 and N3 for performing monitoring functions. The network nodes are in communication with a management centre MC. The communication network 400 may further comprise an external capturing device 405. Data packets sent from a user terminal (not shown) to network node N1 are forwarded within network 400 via network nodes N2 and N3 and are transferred to another user terminal (not shown). The user terminals may be stationary or mobile devices.

When a new network connection 410 is set up, a network connection setup procedure takes place at network node N1. More specifically, a filtering function 415 within network node N1 filters incoming network traffic during connection setup. In case a connection setup message arrives in network node N1 via its interface, a filtering function based on the filter conditions received via link 430 from management centre MC is performed at filtering function 415. In this exemplary embodiment, the filtering function is based on the filter condition if a mobile terminal (not shown) is located in a certain network cell (not shown) which is known for having a high traffic load. In case the filter condition applies, network node N1 assigns a local identifier from the first set of local identifiers to the network connection (network node N1 has initially selected a first set of local identifiers from a larger second set of local identifiers). The selection of the subscribers to be monitored, i.e. the filter condition, is important for receiving optimised traffic monitoring data. The filtering procedure will be described in more detail below with regard to FIG. 5.

Thereafter, associations of incoming network traffic with any one of the allocated local identifiers are checked within network node N1. This may for example be realized by checking incoming data packets for their associations with any one of the previously selected and assigned local identifiers. In case incoming network traffic is actually associated with the allocated local identifier, this network traffic is monitored.

As indicated by arrows 430, 445 and 450, management centre MC forwards filter conditions to network nodes N1, N2, N3, requests the first set of local identifiers (and/or local identifiers from the first set that have actually been allocated) from network node N1, and forwards the first set of local identifiers (and/or the allocated local identifiers) to network nodes N2 and N3. Management centre MC enables coordinated traffic monitoring within the network between the network nodes by forwarding local identifiers which have been allocated for traffic monitoring by network node N1 to all relevant network nodes N2 and N3. Management centre MC may also provide a matching network or a look-up table (not shown) in order to provide an association between local identifiers of network node N1 and corresponding local identifiers in other network nodes N2 and N3. Since the management centre MS may provide a sharing the local identifiers allocated for traffic monitoring among all network nodes N1, of N2, and N3, real time signalling between the network nodes can be avoided.

FIG. 4 further shows an optional physical monitoring port 425. Monitored traffic may be forwarded to physical monitoring port 425. Network node N1 may also comprise an optional traffic filter 420. An external capturing device 405 is located between network nodes N1 and N2. Management centre MC may forward the first set of local identifiers, which it has received from network node N 1, to external capturing device 405. Thereafter, external capturing device 405 captures network traffic which is associated with the specific local identifier of the first set of local identifiers. Within external capturing device 405, the captured data may be stored and further processed for network analysis purposes.

An advantage of the approach proposed herein is that not all network traffic passing the monitoring component is monitored, but only the network traffic which is associated with a local identifier from the selected first set of local identifiers. Therefore, the captured traffic is significantly decreased as compared to known solutions.

Figure 5:
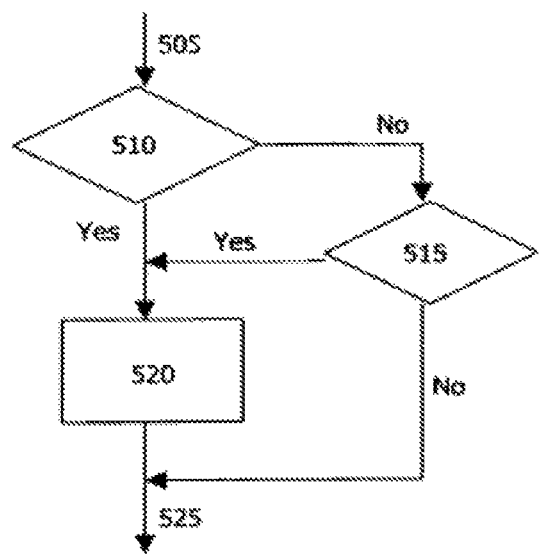
FIG. 5 is a flow chart illustrating a third method embodiment relating to monitoring network traffic.

A method embodiment for executing the filtering function is now described in more detail with reference to flow chart 500 of FIG. 5. In this embodiment, an incoming connection setup message 505 arrives via an interface at a monitoring component, e.g. at network node N1. Filtering function checks 510 if a local identifier from the first set of local identifiers has already been allocated to the incoming network connection. In case a local identifier from the first set of local identifiers has been allocated to the network connection (Yes), the network connection is marked and the local identifier remains allocated 520.

In case no local identifier from a set of local identifiers is allocated to the incoming network connection (No), a filtering function 515 takes place. Filtering function 515 determines if a filtering condition for the incoming network connection applies. In this exemplary embodiment, the filtering condition is based on whether a subscriber is located in a certain network cell which is known for high traffic load.

In case the filtering condition does not apply (No), connection setup is continued 525. In this case, no traffic monitoring for this network connection takes place. In case a filter condition applies (Yes), i.e. the subscriber which is initiating network connection setup is located within the specific network cell, the network connection is marked 520 in order to allocate a local identifier from the first set of local identifiers to the incoming network connection. Thereafter, connection setup continues 525. In this case, the incoming connection is selected for network traffic monitoring.

Figure 6:
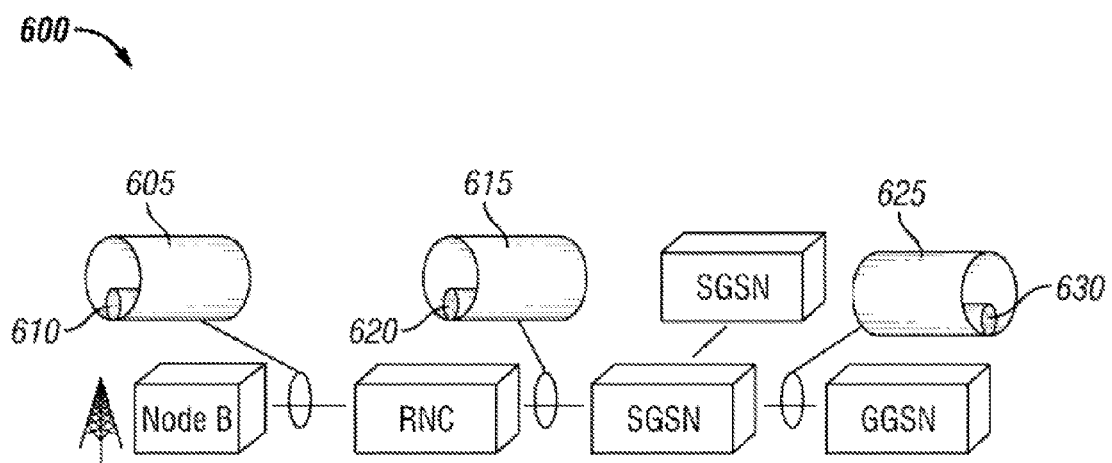
FIG. 6 is a schematic block diagram illustrating an embodiment relating to capturing signalling messages within a communication network.

FIG. 6 shows an exemplary embodiment of a communication network 600 in which filter signalling messages are captured at UMTS interfaces. The embodiment according to FIG. 6 shows parts of a UMTS network as specified in the 3GPP standard. The traffic monitoring task according to this embodiment is to capture all signalling messages of a subset of subscribers. The network shown in FIG. 6 comprises a Node B, an RNC, two SGSNs and one GGSN.

FIG. 6 schematically illustrates the (larger) sets of local identifiers 605, 615 and 625 as tubes having a larger diameter at the different network interfaces between the network nodes. From each larger set of local identifiers 605, 615 and 625, a smaller set (or subset) of local identifiers 610, 620 and 630 is selected as visualized by a tube having a smaller diameter but located within the respective tube with larger diameter.

In embodiment of FIG. 6, the local identifiers 605, 615, 625 of the signalling bearers are regarded. The local identifiers of the Iub interface between NodeB and RNC are Stream Control Transmission Protocol (SCTP) ports 605. The local identifiers of the Iu-PS interface between RNC and SGSN are the Skinny Client Control Protocol (SCCP) Local References (LocRef) 615. The local identifiers of the Gn interface between SGSN and GGSN are the GPRS Tunnelling Protocol Control (GTP-C) Tunnel Endpoint Identifier (TEID) 625.

If a new subscriber accesses the network via a common channel, based on its IMSI and/or Packet Temporary Mobile Subscriber Identity (P-TMSI) and information from the management centre (not shown), the network, for example the RNC, is able to decide whether the selected local identifiers are to be allocated from the sets of local identifiers 610, 620 and 630. All network nodes participating in the communication are able to allocate the respective local identifiers. The captured data packets may then be transmitted from the monitoring components to a central physical monitoring port (not shown), in which the traffic data from all monitoring components may be processed and further analyzed if necessary.

Figure 7:
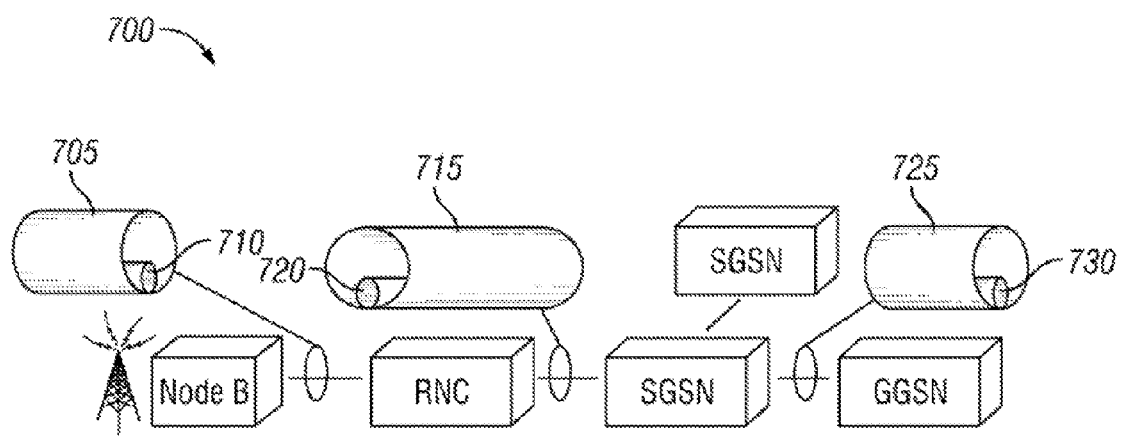
FIG. 7 is a schematic block diagram illustrating an embodiment relating to capturing user plane traffic within a communication network.

FIG. 7 shows an exemplary embodiment of a UMTS network 700 in which filtered user plane traffic is captured at the interfaces between the network nodes. In particular, FIG. 7 shows a UMTS network comprising a NodeB, a RNC, two SGSNs and one GGSN. The traffic monitoring task shown in FIG. 7 is to capture all user plane data packets of a subset of subscribers at the interfaces between the network nodes. FIG. 7 shows the larger sets local identifiers 705, 715, 725 of the transport bearers. The local identifiers of the Iub interface between NodeB and RNC are User Data Protocol (UDP) ports 705 which are communicated as a NodeB Adaption Protocol (NBAP) Binding-ID. The local identifiers of the Iu-PS interface between RNC and SGSN are the GPRS Tunnelling-User (GTP-U) TEID 715 which are established by the Radio Access Network Application Part (RANAP) and the transport Binding-ID. The local identifiers of the Gn interface between SGSN and GGSN are the GTP-U TEID 725. From the larger sets of local identifiers 705, 715 and 725 (again visualized as tubes having a larger diameter), individual smaller sets of local identifiers 710, 720 and 730 (again visualized as tubes of smaller diameter arranged within larger diameter tubes) are selected.

Similarly to the embodiment according to FIG. 6, if a new user accesses the network via a common channel, based on its IMSI and/or Packet Temporary Mobile Subscriber Identity (P-TMSI) and information from the management centre (not shown), the network, for example the RNC, is able to decide whether one of the selected local identifiers is to be allocated for indicating that the respective network connection shall be monitored. All network nodes participating in the communication are able to allocate the respective local identifiers from the selected sets of local identifiers 710, 720 and 730.

The technique for monitoring traffic in a network proposed herein has a plurality of advantages. By means of the proposed smart coordination and selection of local identifiers for monitoring purposes, events of subscribers taking place at several monitoring components can be recorded and correlated. This significantly increases the observability of network traffic for performance and fault management purposes. Another advantage is that the set of subscribers to be monitored can be individually controlled.

The technique for monitoring traffic in a network as proposed herein requires some more intelligence at the monitoring component; however, it does not necessarily impose additional processing load on the network node or the monitoring component. Any network node may act as a monitoring component, and filtering and monitoring functions can be completely separated from the core network functions. The monitoring functions and the core network functions can be executed by separate cards or blades within the network node.

As a further advantage, no real time solution for harmonizing traffic monitoring is required for monitoring network traffic of the same subscriber at a plurality of monitoring components network-wide. General network signalling may be implicitly used for this purpose. This can be realized by allocating local identifiers, in particular during connection setup procedures of neighbouring network nodes. Signalling procedures of a network which was standardized according to the Third Generation Partnership Project (3GPP) may be used.

Selection of subscribers for traffic monitoring may be performed by the network (via filter rules). Therefore, the requirements on the monitoring components are rather low. For example, protocol parsing and global ID matching is not necessary. Such functions are executed by the network independent of traffic monitoring. The functions may be reused in order assist traffic monitoring. Since the filtering task is reduced to checking local identifiers for matches at the lowest protocol layer, the monitoring component can have a simple structure and can process network traffic, e.g. data packets, with a high transmission rate.

The network traffic monitoring may be implemented within the network, i.e. within the network nodes. Therefore, external probes and management systems can be avoided. This may decrease the cost for traffic monitoring.

According to the approach presented herein, the sets of local identifier are selected in a coordinated way, because events relating to a subscriber which occur at different monitoring components can be correlated during post-processing. Post-processing can for example be a calculation of key performance indicators or a fault localisation.

Although embodiments of the present invention have been illustrated in the accompanying drawings and described in the description, it will be understood that the invention is not limited to the embodiments disclosed herein. In particular, the invention is capable of numerous rearrangements, modifications and substitution without departing from the spirit of the invention as set forth and defined by the following claims.

The invention claimed is:

1. A method for monitoring traffic in a network, the network comprising a first monitoring component, the method comprising:
providing a first set of local identifiers selected from a larger second set of local identifiers locally used within a network node to identify a user terminal for monitoring traffic thereof and the first set of local identifiers and the second set of local identifiers provide unique identification of a network connection at the first monitoring component;
filtering incoming connection setup messages;
allocating a local identifier of the first set of local identifiers to the network connection if a filter condition applies during the filtering;
checking incoming data packets for associations with the first set of local identifiers; and
selectively monitoring network traffic associated with the local identifier of the first set of local identifiers.

2. The method according to claim 1, wherein network connections are filtered when network connection set up procedures are performed.

3. The method according to claim 1, wherein the filter condition is based on at least one of a random filtering, a selection of predefined International Mobile Subscriber Identities (IMSI), and a subscriber location-dependent filtering.

4. The method according to claim 1, further comprising: monitoring only local identifiers of a lowest applicable protocol layer of the network.

5. The method according to claim 1, further comprising: receiving the filter condition by the first monitoring component from a management center.

6. The method according to claim 1, further comprising: providing a second monitoring component in the network for traffic monitoring.

7. The method according to claim 6, further comprising: forwarding the first set of local identifiers from the first monitoring component to the second monitoring component.

8. The method according to claim 1, further comprising: forwarding the first set of local identifiers from the first monitoring component to a management center.

9. The method according to claim 1, wherein the filter condition is received by a second monitoring component from a management center to enable coordinated traffic monitoring at the first monitoring component and the second monitoring component.

10. The method according to claim 1, further comprising: logging events associated with monitored network traffic.

11. The method according to claim 10, further comprising: sending the logged events to a physical monitoring port.

12. The method according to claim 1, wherein the first set of local identifiers is a continuous range of local identifiers.

13. A method for monitoring traffic in a network, the network comprising at least a first monitoring component, the method comprising:
forwarding filter conditions to the at least one monitoring component for filtering incoming connection setup messages; and
receiving a first set of local identifiers from the at least one monitoring component, wherein the first set of local identifiers has been selected from a larger second set of local identifiers and is locally used within a network node to identify a user terminal for monitoring traffic thereof and provide unique identification of a particular network connection.

14. The method according to claim 13, further comprising: forwarding the filter conditions to a second monitoring component.

15. The method according to claim 13, further comprising: forwarding the filter conditions to an external capturing device.

16. The method according to claim 13, further comprising: forwarding the first set of local identifiers to a second monitoring component for coordinated traffic monitoring.

17. The method according to claim 13, further comprising: forwarding the first set of local identifiers to an external capturing device for coordinated traffic monitoring.

18. A monitoring component for monitoring traffic in a network, the monitoring component comprising:
a processor; and
a non-transitory computer-readable medium, coupled to the processor, the non-transitory computer-readable medium comprising computer-readable instructions, when executed by the processor, are configured to:
provide a first set of local identifiers selected from a larger second set of local identifiers locally used within a network node to identify a user terminal for monitoring traffic thereof and provide a unique identification of a network connection at the monitoring component,
filter incoming connection setup messages,
allocate a local identifier of the first set of local identifiers to a network connection if a filter condition applies when filtering incoming connection setup messages,
check incoming data packets for associations with the first set identifiers, and
selectively monitor network traffic associated with the local identifier of the first set of local identifiers.

19. A management center for monitoring traffic in a network, the management center comprising:
a processor;
a non-transitory computer-readable medium, coupled to the processor, the non-transitory computer-readable medium comprising computer-readable instructions, when executed by the processor, are configured to:
forward filter conditions to at least one monitoring component for filtering incoming connection setup messages; and
an interface adapted to receive a first set of local identifiers from the at least one monitoring component, wherein the first set of local identifiers has been selected from a larger second set of local identifiers and is locally used within a network node to identify a user terminal for monitoring traffic thereof and provide a unique identification of a particular network connection.

* * * * *